United States Patent [19]

Van der Veken

[11] 4,362,420
[45] Dec. 7, 1982

[54] DEVICE FOR MOUNTING AND REMOVING A CUTTER AT THE END OF THE CUTTER SHAFT FROM A CUTTER DREDGE

[75] Inventor: Corneel R. M. Van der Veken, Wilrijk, Belgium

[73] Assignee: Dredging International, Scheldedijk, Belgium

[21] Appl. No.: 200,419

[22] Filed: Oct. 24, 1980

[30] Foreign Application Priority Data

Oct. 24, 1979 [BE] Belgium ............................. 197799

[51] Int. Cl.³ .................. B25G 3/00; F16B 7/18; F16L 1/00; F16L 15/00
[52] U.S. Cl. ........................... 403/343; 403/12; 403/350; 403/2
[58] Field of Search ............. 403/2, 12, 320, 343, 403/23, 16, 350, 360, 361; 285/3, 81

[56] References Cited

U.S. PATENT DOCUMENTS

| | | |
|---|---|---|
| 1,427,807 | 4/1923 | Halbleib . |
| 1,796,506 | 3/1931 | Conner ................ 403/320 |
| 1,969,431 | 8/1934 | Skinner ................ 403/343 X |
| 2,002,749 | 5/1935 | Neveling, Sr. . |
| 3,489,445 | 1/1970 | Kammerer ........... 403/343 |
| 3,608,933 | 9/1971 | Lee ....................... 403/320 X |
| 3,869,030 | 3/1975 | Masaki ................. 403/320 X |

FOREIGN PATENT DOCUMENTS

| | | |
|---|---|---|
| 53811 | of 0000 | Fed. Rep. of Germany . |
| 237216 | of 0000 | Fed. Rep. of Germany . |
| 2555124 | of 0000 | Fed. Rep. of Germany . |
| 2262749 | of 0000 | France . |
| 2377487 | of 0000 | France . |
| 7710009 | of 0000 | Netherlands . |
| 13132 | of 0000 | United Kingdom . |
| 812789 | of 0000 | United Kingdom . |
| 1127593 | of 0000 | United Kingdom . |

*Primary Examiner*—Wayne L. Shedd
*Attorney, Agent, or Firm*—Brumbaugh, Graves, Donohue & Raymond

[57] ABSTRACT

There is described a device for mounting and removing a cutter at the end of the cutter shaft from a hydraulic or suction dredge, whereby the cutter boss is provided with an inner screw-thread and the cutter shaft with an outer screw-thread. The device is comprised of two concentric rings those surfaces of which facing one another are provided with teeth fitting into one another, whereby the slanting of said teeth is opposite to the angle of said screw-threads, and means are provided to lock both rings during the screwing of the cutter on the shaft thereof, in such a position relative to one another where said rings have so rotated relative to one another that the joint thickness thereof is increased as compared with the joint thickness of the toothed rings when the teeth have completely rotated into one another.

10 Claims, 3 Drawing Figures

DEVICE FOR MOUNTING AND REMOVING A CUTTER AT THE END OF THE CUTTER SHAFT FROM A CUTTER DREDGE

BACKGROUND OF THE INVENTION

The invention relates to a device for mounting and removing a cutter at the end of the cutter shaft of a cutter dredge, the cutter boss being provided with an inner screw-thread and the cutter shaft being provided with an outer screw-thread.

When dredgers are fitted with a cutter head, better known as a cutter, said cutter head is usually replaceable by a new one. It is for this purpose that the cutter is provided with an inner screw-thread and the cutter shaft is provided at the end thereof with an outer screw-thread.

The cutter may thus be screwed on said shaft till the cutter boss edge meets a collar on the shaft. The boss bottom can also meet the shaft end.

It is clear that under the action of the butting load on the cutter knives or teeth, said cutter is generally clamped very tightly on the shaft, and cannot generally be screwed off with the available torque from the motor driving the cutter shaft.

To obviate the above-defined drawback, there is generally mounted between the boss and a stop on the cutter shaft, a number of small blocks or a flanged plug. When replacing the cutter, the blocks or the flange are cut-through in such a way that the screw-thread load is removed and the cutter can easily be screwed off. Present-day suction dredges with large dredging capacity use in general blocks made of steel, also called cutting blocks. Cutting plugs between the cutter shaft end and boss bottom are less frequently used.

The disadvantages of the above-mentioned operating method are as follows:

(a) the cutting-through of said cutting blocks or cutting plug is a time-consuming operation which results in a long idle time of the dredge;

(b) when cutting through the cutting blocks or the cutting plug, there is a severe danger of damaging the cutter shaft;

(c) through the space present between the cutting blocks, sand and water may enter the screw-thread from the cutter and cutter shaft. Such entry of water and sand is the cause of corrosion and notch effect which may result in premature shaft breakage;

(d) after every removal of the cutter, the screw-thread must to be cleaned and protected;

(e) when removing the cutter, new blocks or a new cutting plug must to be arranged each time. Even if the protecting plug can be made more water-tight, it is also more expensive.

SUMMARY OF THE INVENTION

This invention has for an object to obviate the above drawbacks and to provide a device which makes it possible to remove rapidly said cutter and which insures moreover the best of tightness against water and sand.

For this purpose, the device according to the invention is comprised of two concentric rings, the surfaces of which facing one another being provided with teeth fitting into one another, whereby the slanting of said teeth is opposite to the angle of said screw-threads. Means are provided to lock both rings during the screwing of the cutter on the shaft thereof, in such a position relative to one another where said rings have so rotated relative to one another, that the joint thickness thereof is increased as compared with the joint thickness of the toothed rings when the teeth thereof have completely rotated into one another.

In a preferred embodiment of the invention, the one toothed ring is connected to a collar which surrounds completely said first ring and at least partly the second ring.

In such an embodiment, said ring which is surrounded partly at least by said collar, is provided with a flange the diameter of which is substantially equal to the diameter of said collar.

Useful means to lock temporarily said toothed rings relative to one another are formed by a pin which passes through said rings and/or parts connected thereto.

Preferably said pin is made from copper or such a metal which breaks quickly with the rotating relative to one another of said toothed rings.

In a first embodiment, said toothed rings are mounted between the cutter boss and the enlarged portion of the cutter shaft.

In a second embodiment, said toothed rings are mounted inside the cutter boss between the boss bottom and the cutter shaft end.

Other details and features of the invention will stand out from the following description given by way of non limitative example and with reference to the accompanying drawings, in which.

DETAILED DESCRIPTION OF EXEMPLARY EMBODIMENTS

Figure 2:
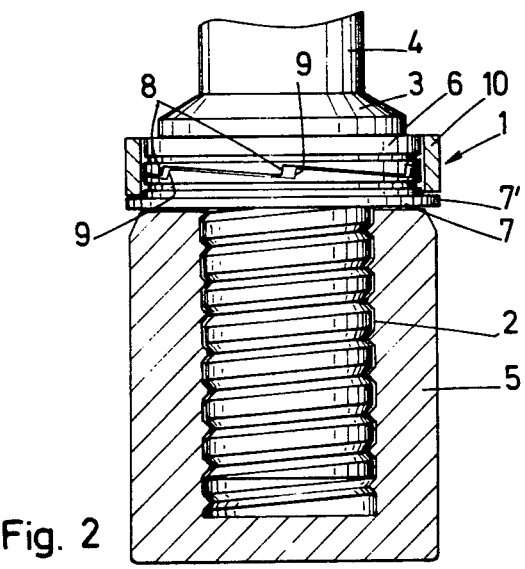
FIG. 2 is a diagrammatic lengthwise section on a smaller scale, of the device according to the invention in said first embodiment, as mounted between the cutter boss and the enlarged portion of the cutter shaft.
Figure 3:
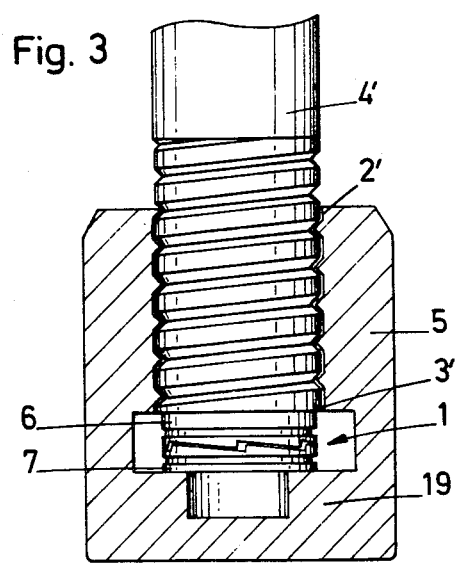
FIG. 3 is a diagrammatic lengthwise section on a smaller scale, of a second embodiment of the device according to the invention, as mounted on the cutter shaft end between the boss bottom and the cutter shaft end.

The device according to the invention is shown generally in FIGS. 2 and 3 with reference number 1. Said device may thus as already mentioned, be mounted between that portion 2 provided with an outer screw-thread, and the enlarged portion of collar 3 of the cutter shaft 4 (FIG. 2).

In the variation as shown in FIG. 3, the device 1 lies completely at end 3' of cutter shaft 4'.

In both embodiments, the cutter boss 5 is provided with an inner screw-thread and portion 2—2' of cutter shaft 4—4' with an outer screw-thread.

Figure 1:
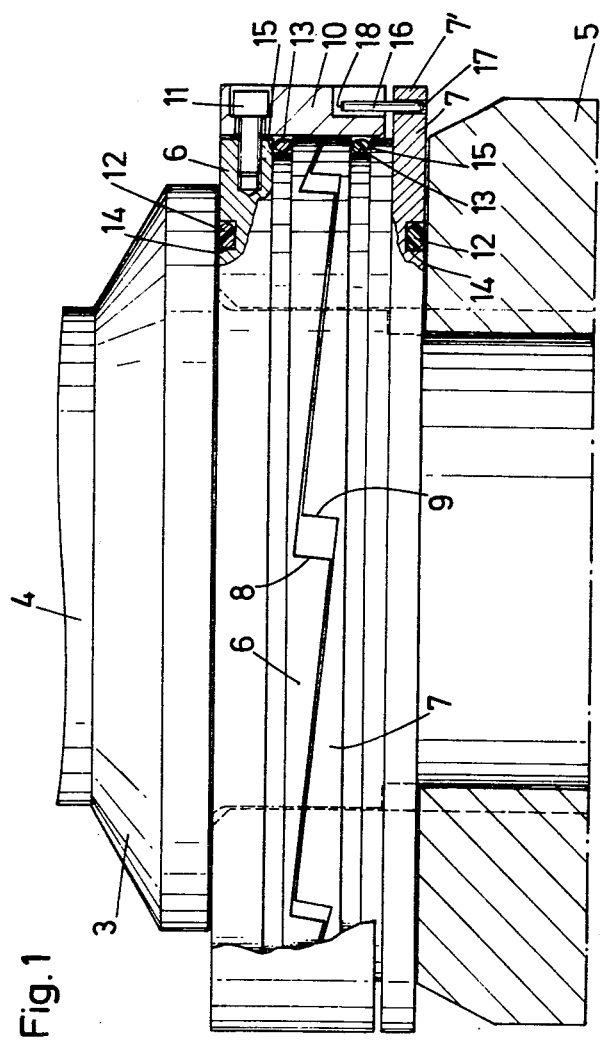
FIG. 1 is a side view with parts cut-away of the toothed rings and the components pertaining thereto, which comprise the device according to the invention in a first embodiment.

The device is shown in detail in FIG. 1.

The device is comprised mainly of two concentric toothed rings 6 and 7. Those ring surfaces facing one another have teeth 8 and 9. The slanting of teeth 8 and 9 is opposite to the angle of the screw-thread 2—2' provided on the cutter shaft 4—4'.

As shown in FIG. 1 the toothed rings 6 and 7 have a joint thickness which is somewhat thicker than when teeth 8 and 9 have rotated completely into one another.

The slanting of teeth 8 and 9 is determined according to the desired ratio between the screw-down torque and the screw-off torque of the cutter on said cutter shaft.

Ring 6 is connected at its side to a collar 10. Said connection can be made with bolts 11 or by welding. Said collar 10 thus surrounds completely the toothed ring 6, but only partly surrounds the toothed ring 7.

The ring 7 is provided with a flange 7'.

Both toothed-ring 6 and toothed ring 7 are provided with sealing rings 12 and 13 which seal against water, mud or sand.

The sealing rings 12 lie inside circle-like grooves 14 in those walls of rings 6 and 7 which face away from one another, while said sealing rings 13 be inside circle-like grooves 15 formed in the lateral surfaces of the rings 6 and 7.

When mounting the cutter, the toothed rings 6 and 7 are so rotated relative to one another that the joint thickness thereof is increased but is not, however, maximized. In such a position, said rings 6 and 7 are locked relative to one another by means of a pin 16, made, for example, from copper or brass, which fits through a bore 17 in flange 7' of ring 7 and through an opening 18 in collar 10.

The only purpose of the pin 16 is to lock toothed rings 6 and 7 in such a position relative to one another that the teeth are prevented from dropping into one another during the mounting operation. For the mounting operation, the joint thickness of said rings 6, 7 should be thicker than the ring thickness when the teeth have completely meshed together. When screwing off the cutter, the teeth slide in one another and there thus appears a play which aids in screwing-off the cutter.

The cutter is then rotated on the screw-threaded end of the cutter shaft, and the teeth 8 and 9 on the toothed rings 6 and 7 try to ride up one another, with the result that the joint thickness of toothed rings 6 and 7 has a tendency to increase. Such motion is, however, resisted due to the friction between the inner tooth faces on the one hand, and the outer faces of the toothed rings which contact the cutter boss and the enlarged portion of the cutter shaft on the other hand.

When screwing-off, that is reverse-rotating the cutter shaft, the pin 16 breaks-off directly and the slanting angle of teeth 8 and 9 adds up to the slanting angle of the screw-thread on said cutter and shaft end. The total slanting angle thus approximates the total friction angle of the screwed connection. There results therefrom the above-defined ratio between screwing-down torque and screwing-off torque. Such ratio is the same as the ratio provided by a much coarser screw-thread, which cannot always be used due to technical reasons. The advantages of the structure according to the invention are notably as follows:

(a) removing of the cutter is limited to a simple screwing-off thereof, which screwing-off is made possible by the above-defined working of the device according to the invention. It is thus no longer necessary to take into account the time losses due to the cutting-through of a cutting plug or blocks;

(b) damages due to unintentional burning-in of the shaft end no longer occur;

(c) limited torsional straining of the cutter shaft and cutter chain when screwing-off result;

(d) perfect sealing between cutter and cutter shaft becomes possible in such a way that undesirable corrosion or notch effect no longer occurs;

(e) the device always remains active.

It must be understood that the invention is in no way limited to the above embodiments, and that many changes may be made therein without departing from the scope of the invention as defined by the appended claims.

I claim:

1. A device for mounting and removing a cutter at the end of the cutter shaft of a cutter dredge, a cutter boss being provided with an inner screw-thread and the cutter shaft with an outer screw-thread, which device comprises first and second concentric rings those surfaces of which facing one another being provided with slanting teeth fitting into one another, whereby the slanting of said teeth is opposite to the angle of said screw-threads, and wherein means are provided to lock said first and second rings during the screwing of the cutter on the cutter shaft in such a position relative to one another where said rings have so rotated relative to one another that the joint thickness thereof is increased as compared with the joint thickness of the toothed rings when the teeth thereof have completely rotated into one another.

2. The device as defined in claim 1, in which one of said first and second toothed rings is connected to a collar which surrounds completely said first ring and at least partly surrounds the second ring.

3. The device as defined in claim 2, in which said ring which is surrounded partly at least by said collar is provided with a flange the diameter of which is substantially equal to the diameter of said collar.

4. The device as defined in claim 3, in which said means to lock temporarily said toothed rings relative to one another comprises a pin which passes through said flange and said collar.

5. The device as defined in claim 4, in which said pin is made from copper or such a metal which breaks quickly with the rotating relative to one another of said toothed rings.

6. The device as defined in any one of claims 1 to 5, in which said toothed rings are provided with sealing rings which are mounted inside circle-like grooves in those surfaces facing away from one another of the rings.

7. The device as defined in any one of claims 1 to 5, in which along the outer circumference of said toothed rings are mounted sealing rings which contact the inner surface of said collar.

8. The device as defined in any of claims 1 to 7, in which said toothed rings are mounted between the cutter boss and the enlarged portion of said cutter shaft.

9. The device as defined in any of claims 1 to 5, in which said toothed rings are mounted inside the cutter boss, between the boss bottom and the end of the cutter shaft.

10. The device as defined in claim 9, in which at least one of said rings is in the shape of a disk, when said rings are mounted between the cutter bottom and the cutter shaft end.

* * * * *